(12) United States Patent
Lu et al.

(10) Patent No.: US 11,449,034 B2
(45) Date of Patent: Sep. 20, 2022

(54) MIMO DIFFERENT-FACTOR COMPACT-FORM MODEL-FREE CONTROL

(71) Applicant: ZHEJIANG UNIVERSITY, Zhejiang (CN)

(72) Inventors: Jiangang Lu, Zhejiang (CN); Chen Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 337 days.

(21) Appl. No.: 16/777,234

(22) Filed: Jan. 30, 2020

(65) Prior Publication Data
US 2020/0249659 A1 Aug. 6, 2020

(30) Foreign Application Priority Data
Feb. 1, 2019 (CN) .......................... 201910103067.0

(51) Int. Cl.
*G05B 15/02* (2006.01)
*G05B 19/4155* (2006.01)

(52) U.S. Cl.
CPC ......... *G05B 19/4155* (2013.01); *G05B 15/02* (2013.01); *G05B 2219/33125* (2013.01); *G05B 2219/42017* (2013.01)

(58) Field of Classification Search
None
See application file for complete search history.

(56) References Cited

U.S. PATENT DOCUMENTS

| 2020/0249636 | A1* | 8/2020 | Lu | ........................ | G05B 13/024 |
| 2020/0249641 | A1* | 8/2020 | Lu | ........................ | G05B 13/041 |
| 2020/0249642 | A1* | 8/2020 | Lu | ........................ | G05B 13/024 |
| 2020/0249643 | A1* | 8/2020 | Lu | ........................ | G06N 3/0445 |
| 2020/0249659 | A1* | 8/2020 | Lu | ........................ | G05B 13/024 |

* cited by examiner

*Primary Examiner* — Ryan A Jarrett
(74) *Attorney, Agent, or Firm* — Muncy, Geissler, Olds & Lowe, P.C.

(57) ABSTRACT

The invention discloses a MIMO different-factor compact-form model-free control method. In view of the limitations of the existing MIMO compact-form model-free control method with the same-factor structure, namely, at time k, different control inputs in the control input vector can only use the same values of penalty factor and step-size factor, the invention proposes a MIMO compact-form model-free control method with the different-factor structure, namely, at time k, different control inputs in the control input vector can use different values of penalty factors and/or step-size factors, which can solve control problems of strongly nonlinear MIMO systems with different characteristics between control channels widely existing in complex plants. Compared with the existing control method, the inventive method has higher control accuracy, stronger stability and wider applicability.

3 Claims, 6 Drawing Sheets

MIMO DIFFERENT-FACTOR COMPACT-FORM MODEL-FREE CONTROL

FIELD OF THE INVENTION

The present invention relates to the field of automatic control, and more particularly to MIMO different-factor compact-form model-free control.

BACKGROUND OF THE INVENTION

In the fields of oil refining, petrochemical, chemical, pharmaceutical, food, paper, water treatment, thermal power, metallurgy, cement, rubber, machinery, and electrical industry, most of the controlled plants, such as reactors, distillation columns, machines, devices, equipment, production lines, workshops and factories, are essentially MIMO systems (multi-input multi-output systems). Realizing the control of MIMO systems with high accuracy, strong stability and wide applicability is of great significance to energy saving, consumption reduction, quality improvement and efficiency enhancement in industries. However, the control problems of MIMO systems, especially of those with strong nonlinearities, have always been a major challenge in the field of automatic control.

MIMO compact-form model-free control method is one of the existing control methods for MIMO systems. MIMO compact-form model-free control method is a data-driven control method, which is used to analyze and design the controller depending only on the online measured input data and output data instead of any mathematical model information of the MIMO controlled plant, and has good application prospects with concise implementation, low computational burden and strong robustness. The theoretical basis of MIMO compact-form model-free control method is proposed by Hou and Jin in *Model Free Adaptive Control: Theory and Applications* (Science Press, Beijing, China, 2013, p. 93), the control scheme is given as follows:

$$u(k) = u(k-1) + \frac{\Phi^T(k)\rho e(k)}{\lambda + \|\Phi(k)\|^2}$$

where $u(k)$ is the control input vector at time k, $u(k)=[u_1(k), \ldots, u_m(k)]^T$, m is the total number of control inputs (m is a positive integer greater than 1); $e(k)$ is the error vector at time k, $e(k)=[e_1(k), \ldots, e_n(k)]^T$, n is the total number of system outputs (n is a positive integer); $\Phi(k)$ is the estimated value of pseudo partitioned Jacobian matrix for MIMO system at time k, $\|\Phi(k)\|$ is the 2-norm of matrix $\Phi(k)$; $\lambda$ is the penalty factor; $\rho$ is the step-size factor.

The above-mentioned existing MIMO compact-form model-free control method adopts the same-factor structure, namely, at time k, different control inputs $u_1(k), \ldots, u_m(k)$ in the control input vector $u(k)$ can only use the same value of penalty factor $\lambda$, and the same value of step-size factor $\rho$. However, when applied to complex plants, such as strongly nonlinear MIMO systems with different characteristics between control channels, the existing MIMO compact-form model-free control method with the same-factor structure is difficult to achieve ideal control performance, which restricts the popularization and application of MIMO compact-form model-free control method.

Therefore, in order to break the bottleneck of the existing MIMO compact-form model-free control method with the same-factor structure, the present invention proposes a method of MIMO different-factor compact-form model-free control.

SUMMARY OF THE INVENTION

The present invention addresses the problems cited above, and provides a method of MIMO different-factor compact-form model-free control, the method comprising:

when a controlled plant is a MIMO system, namely a multi-input multi-output system, a mathematical formula for calculating the i-th control input $u_i(k)$ at time k using said method is as follows:

$$u_i(k) = u_i(k-1) + \frac{\rho_i \sum_{j=1}^{n} \phi_{j,i}(k) e_j(k)}{\lambda_i + \|\Phi(k)\|^2}$$

where k is a positive integer; n is the total number of system outputs in said MIMO system, n is a positive integer; i denotes the i-th of the total number of control inputs in said MIMO system, i is a positive integer, $1 \leq i \leq m$, where m is the total number of control inputs in said MIMO system and m is a positive integer greater than 1; j denotes the j-th of the total number of system outputs in said MIMO system, j is a positive integer, $1 \leq j \leq n$; $u_i(k)$ is the i-th control input at time k; $e_j(k)$ is the j-th error at time k, namely the j-th element in the error vector $e(k)=[e_1(k), \ldots, e_n(k)]^T$; $\Phi(k)$ is the estimated value of pseudo partitioned Jacobian matrix for said MIMO system at time k, $\phi_{j,i}(k)$ is the j-th row and the i-th column of matrix $\Phi(k)$, $\|\Phi(k)\|$ is the 2-norm of matrix $\Phi(k)$; $\lambda_i$ is the penalty factor for the i-th control input; $\rho_i$ is the step-size factor for the i-th control input;

for said MIMO system, traversing all values of i in the positive integer interval [1, m], and calculating the control input vector $u(k)=[u_1(k), \ldots, u_m(k)]^T$ at time k using said method;

said method has a different-factor characteristic; said different-factor characteristic is that at least one of the following two inequalities holds true for any two unequal positive integers i and x in the positive integer interval [1, m] during controlling said MIMO system by using said method:

$$\lambda_i \neq \lambda_x; \rho_i \neq \rho_x$$

While adopting the above-mentioned technical scheme, the invention may adopt or combine the following further technical schemes:

Said j-th error $e_j(k)$ at time k is calculated by the j-th error function; independent variables of said j-th error function comprise the j-th desired system output and the j-th actual system output.

Said j-th error function adopts at least one of: $e_j(k)=y^*_j(k)-y_j(k)$, $e_j(k)=y^*_j(k+1)-y_j(k)$, $e_j(k)=y_j(k)-y^*_j(k)$, and $e_j(k)=y_j(k)-y^*_j(k+1)$, where $y^*_j(k)$ is the j-th desired system output at time k, $y^*_j(k+1)$ is the j-th desired system output at time k+1, and $y_j(k)$ is the j-th actual system output at time k.

Said controlled plant comprises at least one of: a reactor, a distillation column, a machine, a device, a set of equipment, a production line, a workshop, and a factory.

The hardware platform for running said method comprises at least one of: an industrial control computer, a single chip microcomputer controller, a microprocessor controller, a field programmable gate array controller, a digital signal processing controller, an embedded system controller, a programmable logic controller, a distributed control system, a fieldbus control system, an industrial control system based on internet of things, and an industrial internet control system.

The inventive MIMO different-factor compact-form model-free control method uses different penalty factors or step-size factors for different control inputs in the control input vector, which can solve control problems of strongly nonlinear MIMO systems with different characteristics between control channels widely existing in complex plants. Compared with the existing MIMO compact-form model-free control method with the same-factor structure, the inventive MIMO different-factor compact-form model-free control method has higher control accuracy, stronger stability and wider applicability.

DETAILED DESCRIPTION OF THE INVENTION

The invention is hereinafter described in detail with reference to the embodiments and accompanying drawings.

It is to be understood that other embodiments may be utilized and structural changes may be made without departing from the scope of the invention.

Figure 1:
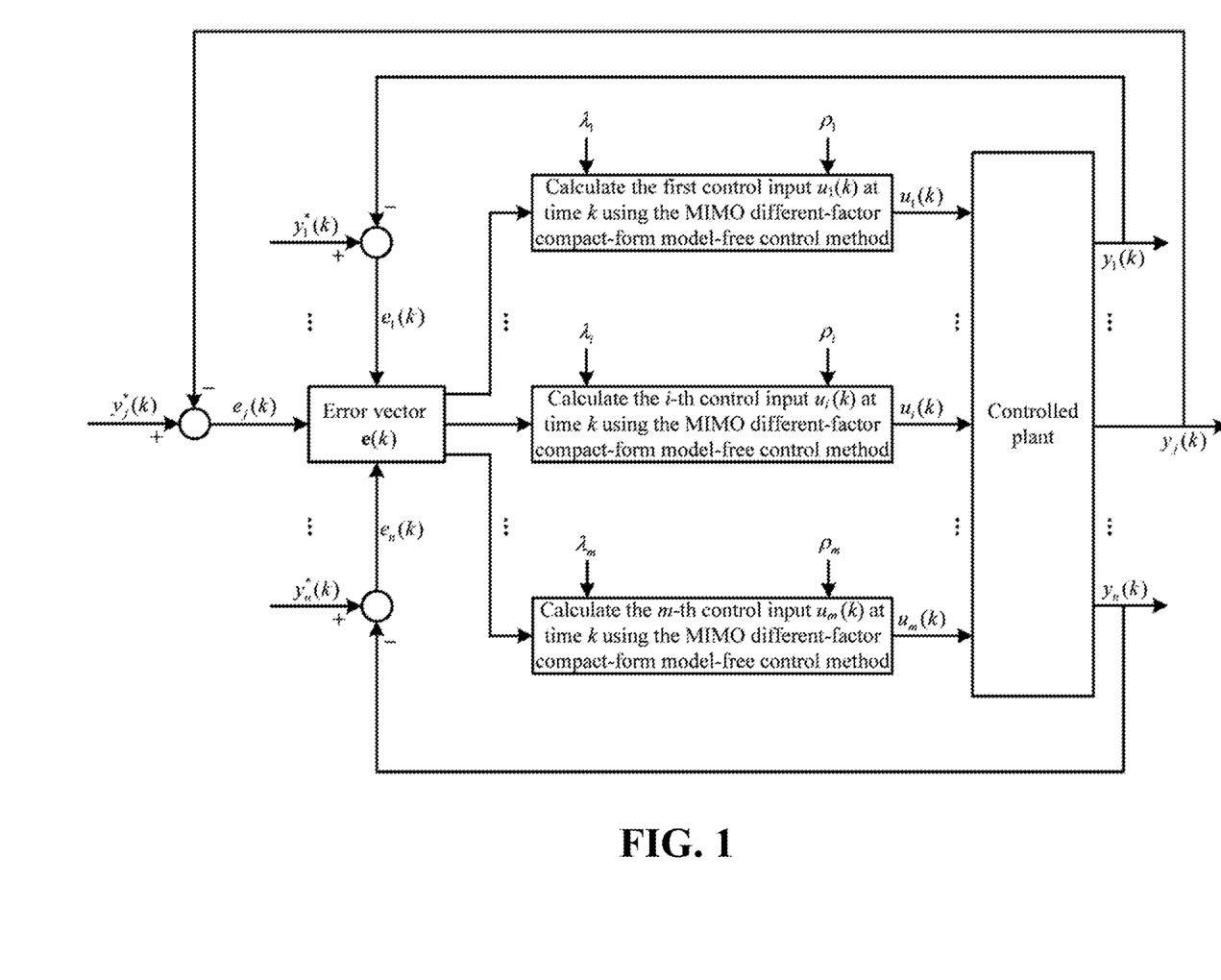
FIG. 1 shows a schematic diagram according to the embodiments of the invention.

FIG. 1 shows a schematic diagram according to the embodiments of the invention. For a MIMO system with m inputs (m is a positive integer greater than 1) and n outputs (n is a positive integer), the MIMO different-factor compact-form model-free control method is adopted to control the system; for the i-th control input $u_i(k)$ (i=1, ... ,m), set the parameters value including penalty factor $\lambda_i$ and step-size factor $\rho_i$ in the mathematical formula for calculating $u_i(k)$ using the MIMO different-factor compact-form model-free adaptive control method; mark the current moment as time k; define the difference between the j-th desired system output $y^*_j(k)$ and the j-th actual system output $y_j(k)$ as the j-th error $e_j(k)$; traverse all values of j in the positive integer interval [1, n] and obtain the error vector $e(k)=[e_1(k), \ldots ,e_n(k)]^T$; based on the error vector $e(k)=[e_1(k), \ldots ,e_n(k)]^T$ at time k, the penalty factor $\lambda_i$, and the step-size factor $\rho_i$, calculate the i-th control input $u_i(k)$ at time k using the MIMO different-factor compact-form model-free adaptive control method; for the MIMO system, traverse all values of i in the positive integer interval [1, m] and calculate the control input vector $u(k)=[u_1(k), \ldots ,u_m(k)]^T$ at time k using the MIMO different-factor compact-form model-free control method; obtain the n actual system outputs at next time by applying the control input vector u(k) into the controlled plant, and then carry out the MIMO different-factor compact-form model-free control method for the next sampling time.

Two exemplary embodiments of the invention are given for further explanation.

The first exemplary embodiment:

A two-input two-output MIMO system, which has the complex characteristics of non-minimum phase nonlinear system, is adopted as the controlled plant, and it belongs to the MIMO system that is particularly difficult to control:

$$y_1(k) = \frac{2.5y_1(k-1)y_1(k-2)}{1+y_1^2(k-1)+y_2^2(k-2)+y_1^2(k-3)} +$$

$$0.09u_1(k-1)u_1(k-2) + 1.2u_1(k-1) + 1.6u_1(k-3) + 0.5u_2(k-1) +$$

$$0.7\sin(0.5(y_1(k-1)+y_1(k-2)))\cos(0.5(y_1(k-1)+y_1(k-2)))$$

$$y_2(k) = \frac{5y_2(k-1)y_2(k-2)}{1+y_2^2(k-1)+y_1^2(k-2)+y_2^2(k-3)} + u_2(k-1) +$$

$$1.1u_2(k-2) + 1.4u_2(k-3) + 0.5u_1(k-1)$$

The desired system outputs y*(k) are as follows:

$y^*_1(k)$=5 sin(k/50)+2 cos(k/20)

$y^*_2(k)$=2 sin(k/50)+5 cos(k/20)

In this embodiment, m=n=2.

In view of the above specific embodiment, two experiments are carried out for comparison and verification. The first experiment adopts the inventive control method, and the second experiment adopts the existing control method. In order to compare the control performance of the two experiments clearly, root mean square error (RMSE) is used as the control performance index for evaluation:

$$RMSE(e_j) = \sqrt{\frac{1}{N}\sum_{k=1}^{N} e^2(k)}$$

where $e_j(k)=y^*_j(k)-y_j(k)$, $y^*_j(k)$ is the j-th desired system output at time k, $y_j(k)$ is the j-th actual system output at time k. The smaller the value of $RMSE(e_j)$ is, the smaller the error between the j-th actual system output and the j-th desired system output is, and the better the control performance gets.

The hardware platform for running the inventive control method is the industrial control computer.

Figure 2:
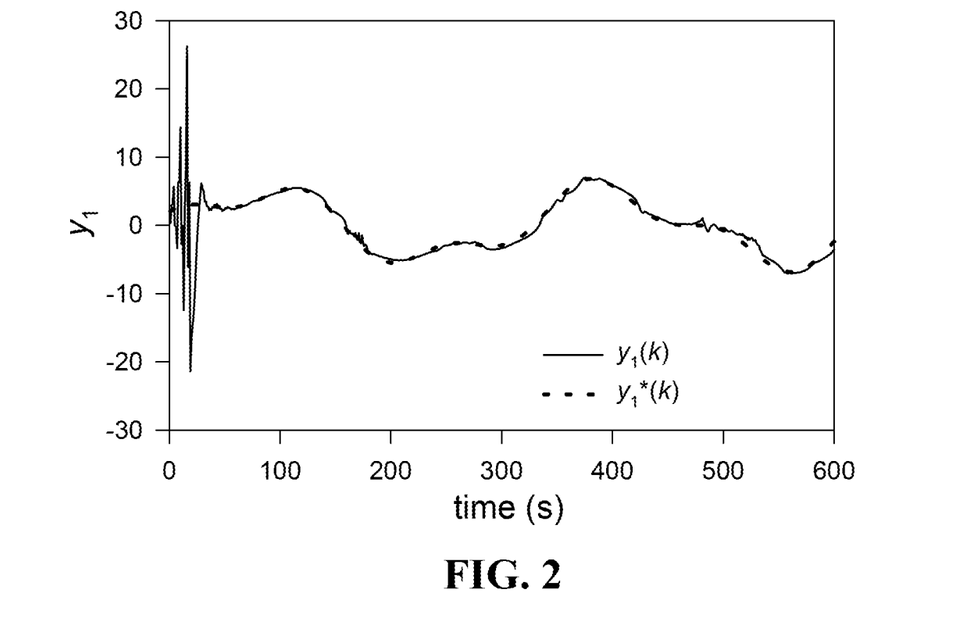
FIG. 2 shows the tracking performance of the first system output when controlling the two-input two-output MIMO system in the first exemplary embodiment by using the inventive MIMO different-factor compact-form model-free control method.
Figure 3:
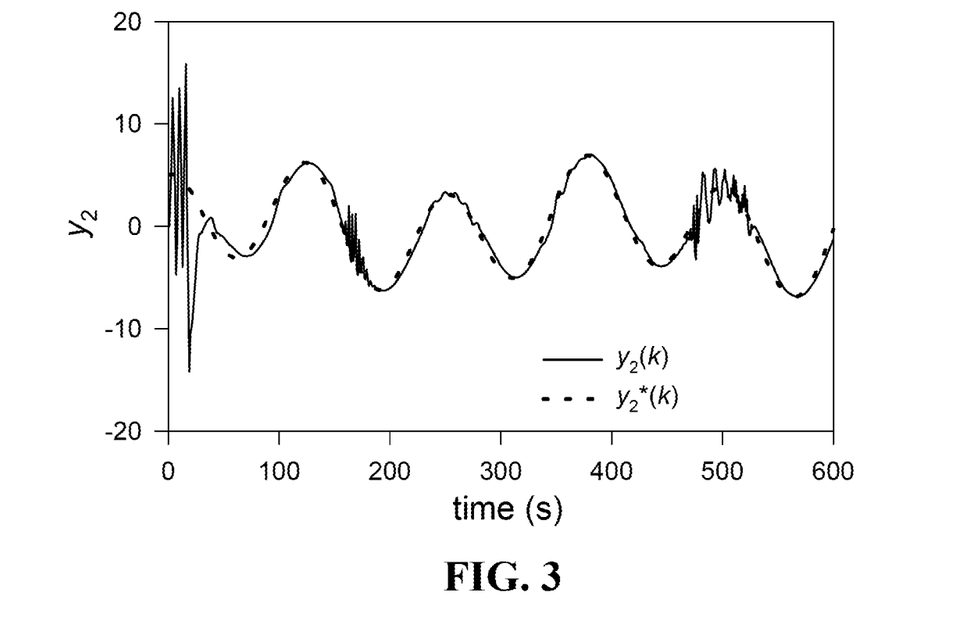
FIG. 3 shows the tracking performance of the second system output when controlling the two-input two-output MIMO system in the first exemplary embodiment by using the inventive MIMO different-factor compact-form model-free control method.
Figure 4:
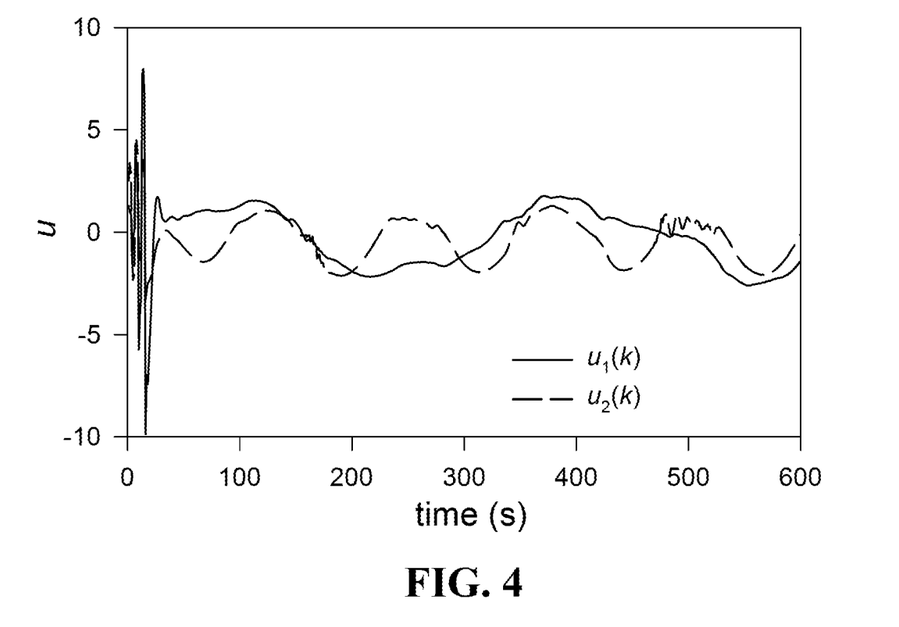
FIG. 4 shows the control inputs when controlling the two-input two-output MIMO system in the first exemplary embodiment by using the inventive MIMO different-factor compact-form model-free control method.

The first experiment (RUN1): the inventive MIMO different-factor compact-form model-free control method is adopted to control the above two-input two-output MIMO system; set the parameters value for calculating the first control input: the penalty factor $\lambda_1=0.01$, the step-size factor $\rho_1=0.37$; set the parameters value for calculating the second control input: the penalty factor $\rho_2=0.24$, the step-size factor $\rho_2=0.49$; the tracking performance of the first system output and the second system output are shown in FIG. 2 and FIG. 3, respectively, and the control inputs are shown in FIG. 4; evaluate the control method from the control performance indexes: the $RMSE(e_1)$ of the first system output in FIG. 2 is 2.2947, and the $RMSE(e_2)$ of the second system output in FIG. 3 is 1.1935.

Figure 5:
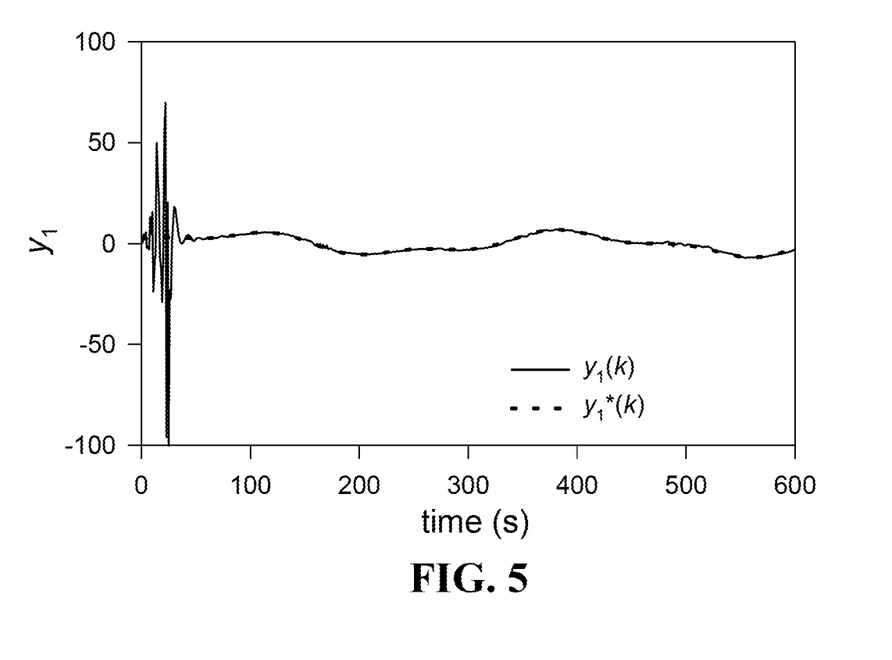
FIG. 5 shows the tracking performance of the first system output when controlling the two-input two-output MIMO system in the first exemplary embodiment by using the existing MIMO compact-form model-free control method with the same-factor structure.
Figure 6:
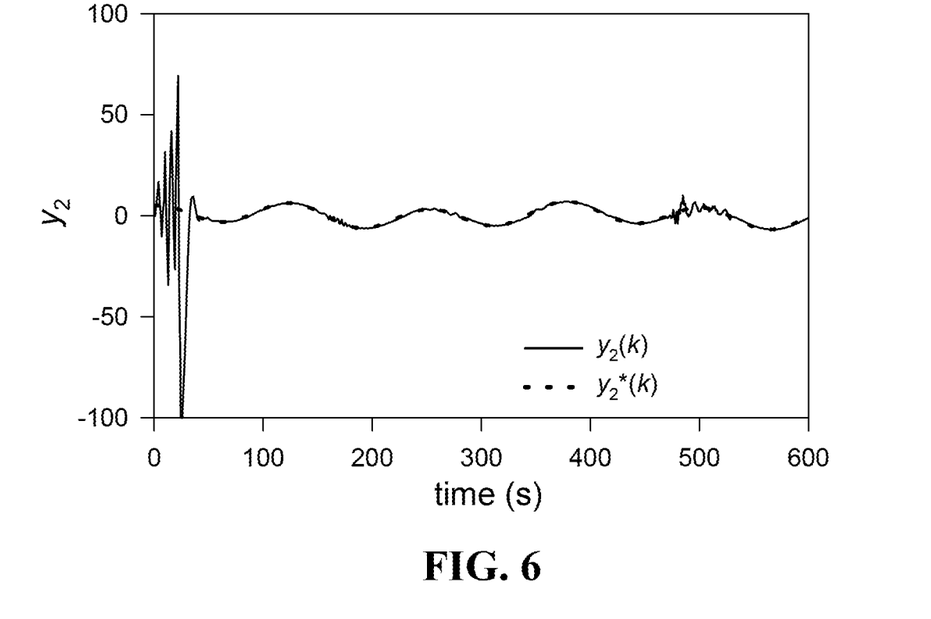
FIG. 6 shows the tracking performance of the second system output when controlling the two-input two-output MIMO system in the first exemplary embodiment by using the existing MIMO compact-form model-free control method with the same-factor structure.
Figure 7:
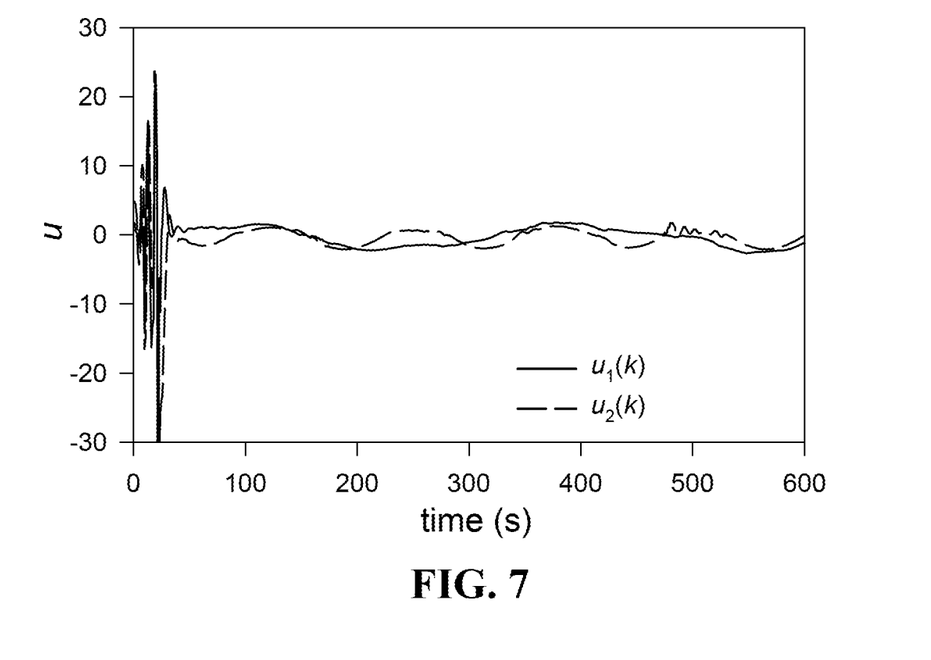
FIG. 7 shows the control inputs when controlling the two-input two-output MIMO system in the first exemplary embodiment by using the existing MIMO compact-form model-free control method with the same-factor structure.

The second experiment (RUN2): the existing MIMO compact-form model-free control method with the same-factor structure is adopted to control the above two-input two-output MIMO system; set the penalty factor $\lambda=0.01$, the step-size factor $\rho=0.50$; the tracking performance of the first system output and the second system output are shown in FIG. 5 and FIG. 6, respectively, and the control inputs are shown in FIG. 7; evaluate the control method from the control performance indexes: the $RMSE(e_1)$ of the first system output in FIG. 5 is 7.8933, and the $RMSE(e_2)$ of the second system output in FIG. 6 is 10.5405.

The comparison results of control performance indexes of the two experiments are shown in Table 1; the results of the first experiment (RUN1) using the inventive control method are superior to those of the second experiment (RUN2) using the existing MIMO compact-form model-free control method with the same-factor structure, and the control performance improvement is significant, indicating that the inventive MIMO different-factor compact-form model-free control method has higher control accuracy, stronger stability and wider applicability.

TABLE 1

Comparison Results of The Control Performance

| | The first system output | | The second system output | |
|---|---|---|---|---|
| | $RMSE(e_1)$ | Improvement | $RMSE(e_2)$ | Improvement |
| RUN1 | 2.2947 | 70.926% | 1.9135 | 80.846% |
| RUN2 | 7.8933 | Baseline | 10.5405 | Baseline |

The second exemplary embodiment:

A coal mill is a very important set of equipment that pulverizes raw coal into fine powder, providing fine powder for the pulverized coal furnace. Realizing the control of coal mill with high accuracy, strong stability and wide applicability is of great significance to ensure the safe and stable operation of thermal power plant.

The two-input two-output MIMO system of coal mill, which has the complex characteristics of nonlinearity, strong coupling and time-varying, is adopted as the controlled plant, and it belongs to the MIMO system that is particularly difficult to control. Two control inputs $u_1(k)$ and $u_2(k)$ of the coal mill are hot air flow (controlled by the opening of hot air gate) and recycling air flow (controlled by the opening of recycling air gate), respectively. Two system outputs $y_1(k)$ and $y_2(k)$ of the coal mill are outlet temperature (° C.) and inlet negative pressure (Pa), respectively. The initial conditions of the coal mill are: $u_1(0)=80\%$, $u_2(0)=40\%$, $y_1(0)=70°$ C., $y_2(0)=-400$ Pa. At the 50th second, in order to meet the needs of on-site conditions adjustment in thermal power plant, the desired system output $y^*_1(50)$ is adjusted from 70° C. to 80° C., and the desired system output $y^*_2(k)$ is required to remain unchanged at −400 Pa. In view of the above typical conditions in thermal power plant, two experiments are carried out for comparison and verification. In this embodiment, m=n=2. The hardware platform for running the inventive control method is the industrial control computer.

Figure 8:
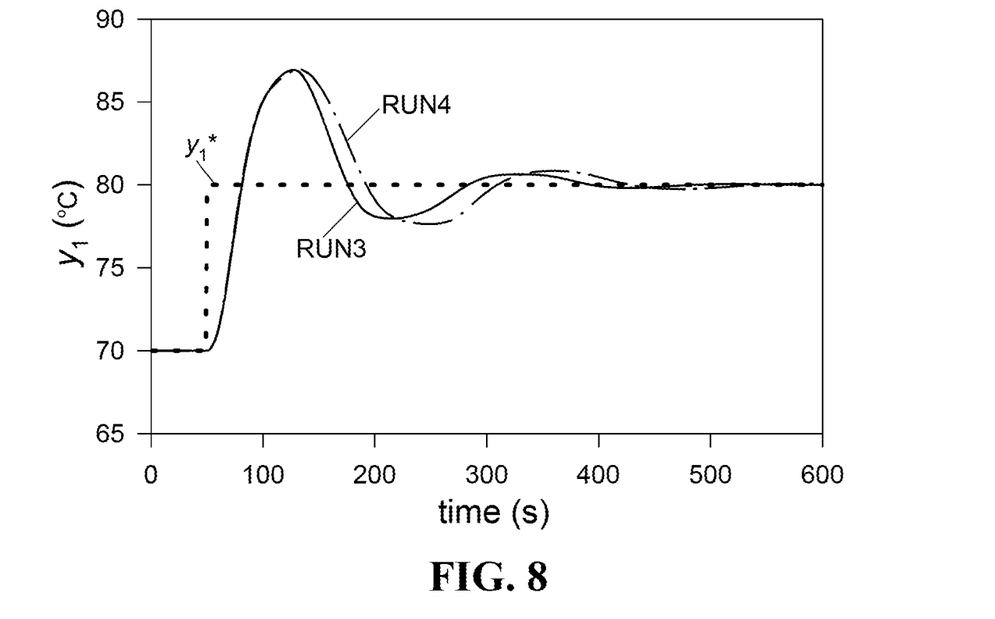
FIG. 8 shows the tracking performance of the first system output when controlling the two-input two-output MIMO system of coal mill in the second exemplary embodiment.
Figure 9:
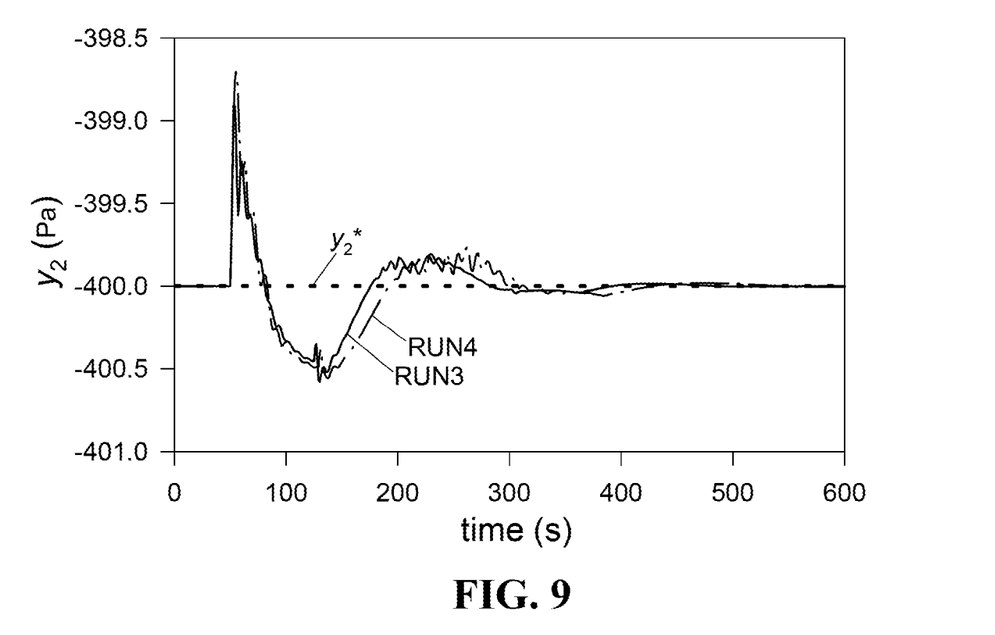
FIG. 9 shows the tracking performance of the second system output when controlling the two-input two-output MIMO system of coal mill in the second exemplary embodiment.
Figure 10:
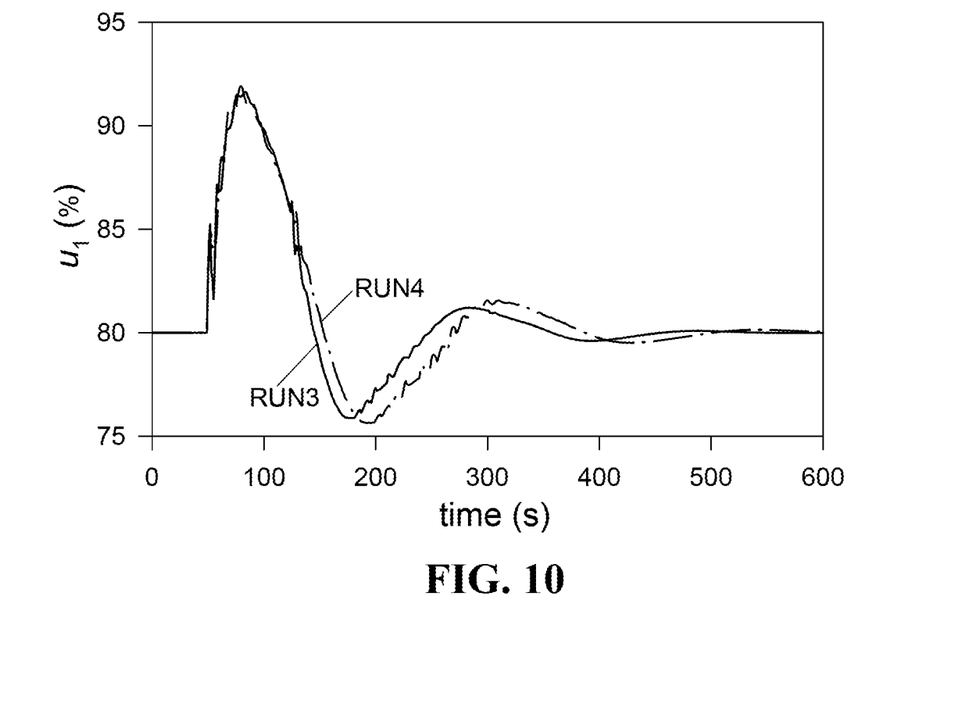
FIG. 10 shows the first control input when controlling the two-input two-output MIMO system of coal mill in the second exemplary embodiment.
Figure 11:
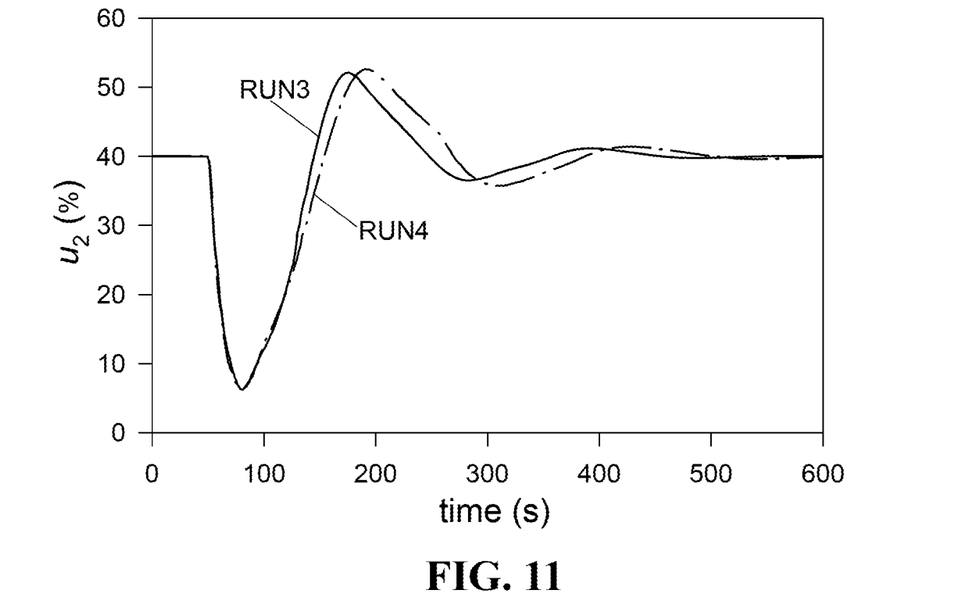
FIG. 11 shows the second control input when controlling the two-input two-output MIMO system of coal mill in the second exemplary embodiment.

The third experiment (RUN3): the inventive MIMO different-factor compact-form model-free control method is adopted to control the above two-input two-output MIMO system; set the parameters value for calculating the first control input: the penalty factor $\lambda_1=0.05$, the step-size factor $\rho_1=1.95$; set the parameters value for calculating the second control input: the penalty factor $\lambda_2=0.05$, the step-size factor $\rho_2=1.92$; the tracking performance of the first system output is shown as RUN3 in FIG. 8, the tracking performance of the second system output is shown as RUN3 in FIG. 9, the first control input is shown as RUN3 in FIG. 10, and the second control input is shown as RUN3 in FIG. 11; evaluate the control method from the control performance indexes: the $RMSE(e_1)$ of the first system output, RUN3 in FIG. 8, is 2.6338, and the $RMSE(e_2)$ of the second system output, RUN3 in FIG. 9, is 0.1882.

The fourth experiment (RUN4): the existing MIMO compact-form model-free control method with the same-factor structure is adopted to control the above two-input two-output MIMO system; set the penalty factor $\lambda=0.07$, the step-size factor $\rho=2$; the tracking performance of the first system output is shown as RUN4 in FIG. 8, the tracking performance of the second system output is shown as RUN4 in FIG. 9, the first control input is shown as RUN4 in FIG. 10, and the second control input is shown as RUN4 in FIG. 11; evaluate the control method from the control performance indexes: the $RMSE(e_1)$ of the first system output, RUN4 in FIG. 8, is 2.8286, and the $RMSE(e_2)$ of the second system output, RUN4 in FIG. 9, is 0.2266.

The comparison results of control performance indexes of the two experiments are shown in Table 2; the results of the third experiment (RUN3) using the inventive control method are superior to those of the fourth experiment (RUN4) using the existing MIMO compact-form model-free control method with the same-factor structure, and the control performance improvement is significant, indicating that the inventive MIMO different-factor compact-form model-free control method has higher control accuracy, stronger stability and wider applicability.

TABLE 2

Comparison Results of The Control Performance of Coal Mill

| | The first system output | | The second system output | |
|---|---|---|---|---|
| | $RMSE(e_1)$ | Improvement | $RMSE(e_2)$ | Improvement |
| RUN3 | 2.6338 | 6.887% | 0.1882 | 16.946% |
| RUN4 | 2.8286 | Baseline | 0.2266 | Baseline |

Furthermore, the following three points should be noted in particular:

(1) In the fields of oil refining, petrochemical, chemical, pharmaceutical, food, paper, water treatment, thermal power, metallurgy, cement, rubber, machinery, and electrical industry, most of the controlled plants, such as reactors, distillation columns, machines, equipment, devices, production lines, workshops and factories, are essentially MIMO systems; some of these MIMO systems have the complex characteristics of non-minimum phase nonlinear system, which belong to the MIMO systems that are particularly difficult to control; for example, the continuous stirred tank reactor (CSTR), commonly used in oil refining, petrochemical, chemical, etc., is a two-input two-output MIMO system, where the two inputs are feed flow and cooling water flow, and the two outputs are product concentration and reaction temperature; when the chemical reaction has strong exothermic effect, the continuous stirred tank reactor (CSTR) is a MIMO system with complex characteristics of non-minimum phase nonlinear system, which is particularly difficult to control. In the first exemplary embodiment, the controlled plant with two inputs and two outputs also has the complex characteristic of non-minimum phase nonlinear system and belongs to the MIMO system that is particularly difficult to control; the inventive controller is capable of controlling the plant with high accuracy, strong stability and wide applicability, indicating that it can also achieve high accuracy, strong stability and wide applicability control on complex MIMO systems such as reactors, distillation columns, machines, equipment, devices, production lines, workshops, factories, etc.

(2) In the first and second exemplary embodiments, the hardware platform for running the inventive controller is the industrial control computer; in practical applications, according to the specific circumstance, a single chip microcomputer controller, a microprocessor controller, a field programmable gate array controller, a digital signal processing controller, an embedded system controller, a programmable logic controller, a distributed control system, a fieldbus control system, an industrial control system based on internet of things, or an industrial internet control system, can also be used as the hardware platform for running the inventive control method.

(3) In the first and second exemplary embodiments, the j-th error $e_j(k)$ is defined as the difference between the j-th desired system output $y^*_j(k)$ and the j-th actual system output $y_j(k)$, namely $e_j(k)=y^*_j(k)-y_j(k)$, which is only one of the ways for calculating the j-th error; the j-th error $e_j(k)$ can also be defined as the difference between the j-th desired system output $y_j(k+1)$ at time k+1 and the j-th actual system output $y_j(k)$, namely $e_j(k)=y^*_j(k+1)-y_j(k)$; the j-th error $e_j(k)$ can also be defined by other ways whose independent variables include the j-th desired system output and the j-th actual system output, for example, $$e_j(k) = \frac{y^*_j(k+1) + y^*_j(k)}{2} - y_j(k);$$

for the controlled plants in the first and second exemplary embodiments, all different definitions of the error function can achieve good control performance.

It should be appreciated that the foregoing is only preferred embodiments of the invention and is not for use in limiting the invention. Any modification, equivalent substitution, and improvement without departing from the spirit and principle of this invention should be covered in the protection scope of the invention.

The invention claimed is:

1. A method of MIMO different-factor compact-form model-free control, executed on a hardware platform for controlling a controlled plant being a multi-input multi-output (MIMO) system, wherein the MIMO system having a predetermined number of control inputs and a predetermined number of system outputs, said controlled plant comprises at least one of: a reactor, a distillation column, a machine, a device, a set of equipment, a production line, a workshop, and a factory, said hardware platform comprises at least one of: an industrial control computer, a single chip microcomputer controller, a microprocessor controller, a field programmable gate array controller, a digital signal processing controller, an embedded system controller, a programmable logic controller, a distributed control system, a fieldbus control system, an industrial control system based on internet of things, and an industrial internet control system, said MIMO different-factor compact-form model-free control method comprising:

calculating the i-th control input $u_i(k)$ at time k as follows:

$$u_i(k) = u_i(k-1) + \frac{\rho_i \sum_{j=1}^{n} \phi_{j,i}(k) e_j(k)}{\lambda_i + \|\Phi(k)\|^2}$$

where k is a positive integer; n is the total number of system outputs in said MIMO system, n is a positive integer; i denotes the i-th of the total number of control inputs in said MIMO system, i is a positive integer, $1 \leq i \leq m$, where m is the total number of control inputs in said MIMO system and m is a positive integer greater than 1; j denotes the j-th of the total number of system outputs in said MIMO system, j is a positive integer, $1 \leq j \leq n$; $u_i(k)$ is the i-th control input at time k; $e_j(k)$ is the j-th error at time k, namely the j-th element in the error vector $e(k)=[e_1(k), \ldots, e_n(k)]^T$; $\Phi(k)$ is the estimated value of pseudo partitioned Jacobian matrix for said MIMO system at time k, $\phi_{j,i}(k)$ is the j-th row and the i-th column of matrix $\Phi(k)$, $\|\Phi(k)\|$ is the 2-norm of matrix $\Phi(k)$; $\lambda_i$ is the penalty factor for the i-th control input; $\rho_i$ is the step-size factor for the i-th control input;

for said MIMO system, calculating a control input vector $u(k)=[u_1(k), \ldots, u_m(k)]^T$, by traversing all values of i in the positive integer interval [1, m];

said MIMO different-factor compact-form model-free control method has a different-factor characteristic; said different-factor characteristic is that at least one of the following two inequalities holds true for any two unequal positive integers i and x in the positive integer interval [1, m] during controlling said MIMO system by using said MIMO different-factor compact-form model-free control method:

$$\lambda_i \neq \lambda_x; \rho_i \neq \rho_x;$$

obtaining the system outputs from the MIMO system by adjusting the control inputs of the MIMO system based on the calculated control input vector, such that the system outputs of the MIMO system approach desired system outputs to be received by the hardware platform.

2. The method as claimed in claim 1 wherein said j-th error $e_j(k)$ at time k is calculated by the j-th error function;

independent variables of said j-th error function comprise the j-th desired system output and the j-th actual system output.

3. The method as claimed in claim 2 wherein said j-th error function adopts at least one of: $e_j(k)=y^*_j(k)-y_j(k)$, $e_j(k)=y^*_j(k+1)-y_j(k)$, $e_j(k)=y_j(k)-y^*_j(k)$, and $e_j(k)=y_j(k)-y^*_j(k+1)$, where $y^*_j(k)$ is the j-th desired system output at time k, $y^*_j(k+1)$ is the j-th desired system output at time k+1, and $y_j(k)$ is the j-th actual system output at time k.

* * * * *